United States Patent
Bello et al.

(10) Patent No.: US 8,880,828 B2
(45) Date of Patent: Nov. 4, 2014

(54) PREFERENTIAL BLOCK RECYCLING IN A REDIRECT-ON-WRITE FILESYSTEM

(75) Inventors: Adekunle Bello, Pflugerville, TX (US); Andrew N. Solomon, Austin, TX (US); Robert Wright Thomson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 13/444,189

(22) Filed: Apr. 11, 2012

(65) Prior Publication Data

US 2013/0275693 A1 Oct. 17, 2013

(51) Int. Cl.
*G06F 12/00* (2006.01)

(52) U.S. Cl.
USPC .......................................................... 711/165

(58) Field of Classification Search
USPC .......................................... 711/159, 160, 165
See application file for complete search history.

(56) References Cited

U.S. PATENT DOCUMENTS

| | | | |
|---|---|---|---|
| 6,571,259 B1 | 5/2003 | Zheng et al. | |
| 7,409,511 B2 | 8/2008 | Edwards et al. | |
| 7,769,723 B2 | 8/2010 | Zheng et al. | |
| 7,783,847 B2 | 8/2010 | Moore et al. | |
| 7,899,989 B2 | 3/2011 | Moore et al. | |
| 2002/0023225 A1* | 2/2002 | Lomnes | 713/200 |
| 2004/0117610 A1* | 6/2004 | Hensley | 713/2 |
| 2007/0106865 A1 | 5/2007 | Moore et al. | |
| 2009/0254725 A1* | 10/2009 | Lomnes | 711/163 |
| 2010/0122052 A1 | 5/2010 | Waldspurger et al. | |
| 2012/0284309 A1* | 11/2012 | Adkins et al. | 707/782 |

* cited by examiner

*Primary Examiner* — John Lane
(74) *Attorney, Agent, or Firm* — John D. Flynn; Gregory K. Goshorn; Greg Goshorn, P.C.

(57) ABSTRACT

Provided are techniques for more efficient data storage on a computing system. An inode table is provided and populated with information relating to current and N previous locations within data storage that a particular data block has been stored. When a particular data block is modified in a redirect on write system, the modified data block is stored, if possible in a previous storage location for that particular data block and the current data location may be saved for use as the location for a subsequent modification.

25 Claims, 7 Drawing Sheets

PREFERENTIAL BLOCK RECYCLING IN A REDIRECT-ON-WRITE FILESYSTEM

FIELD OF DISCLOSURE

The claimed subject matter relates generally to computing systems and, more specifically, to management of disk space in a computer file system.

SUMMARY

Provided are techniques for improving memory management within a computer file system. Currently, many computing system employ a "Redirect-on-Write" technique. In a Redirect-on-Write file system, each time a block of a file is modified or updated, the data for that block is saved to a different location in persistent storage. The previous location in persistent storage is freed for use by other files/data once the data no longer needs to be preserved by this file or any dependent files such as snapshots, i.e. a read-only previous state of a file, or clones, i.e. a divergent writable view of a file. Redirect-on-Write file systems also typically use an Xtree to access metadata in which an inode stores an address that points to a series of internal nodes or leaf nodes where a particular block of data is stored.

Provided are techniques for efficient memory management in a computing system that include receiving a data storage request corresponding to data block stored at a current storage location; correlating data block to an inode; retrieving, from the inode, a previous storage location corresponding to a previous storage location at which the data block was stored; saving the data block at the previous storage location; and saving, in conjunction with the inode, information identifying the current location as a new previous location and the previous location as a new current location.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures, in which:

DETAILED DESCRIPTION

Figure 1:
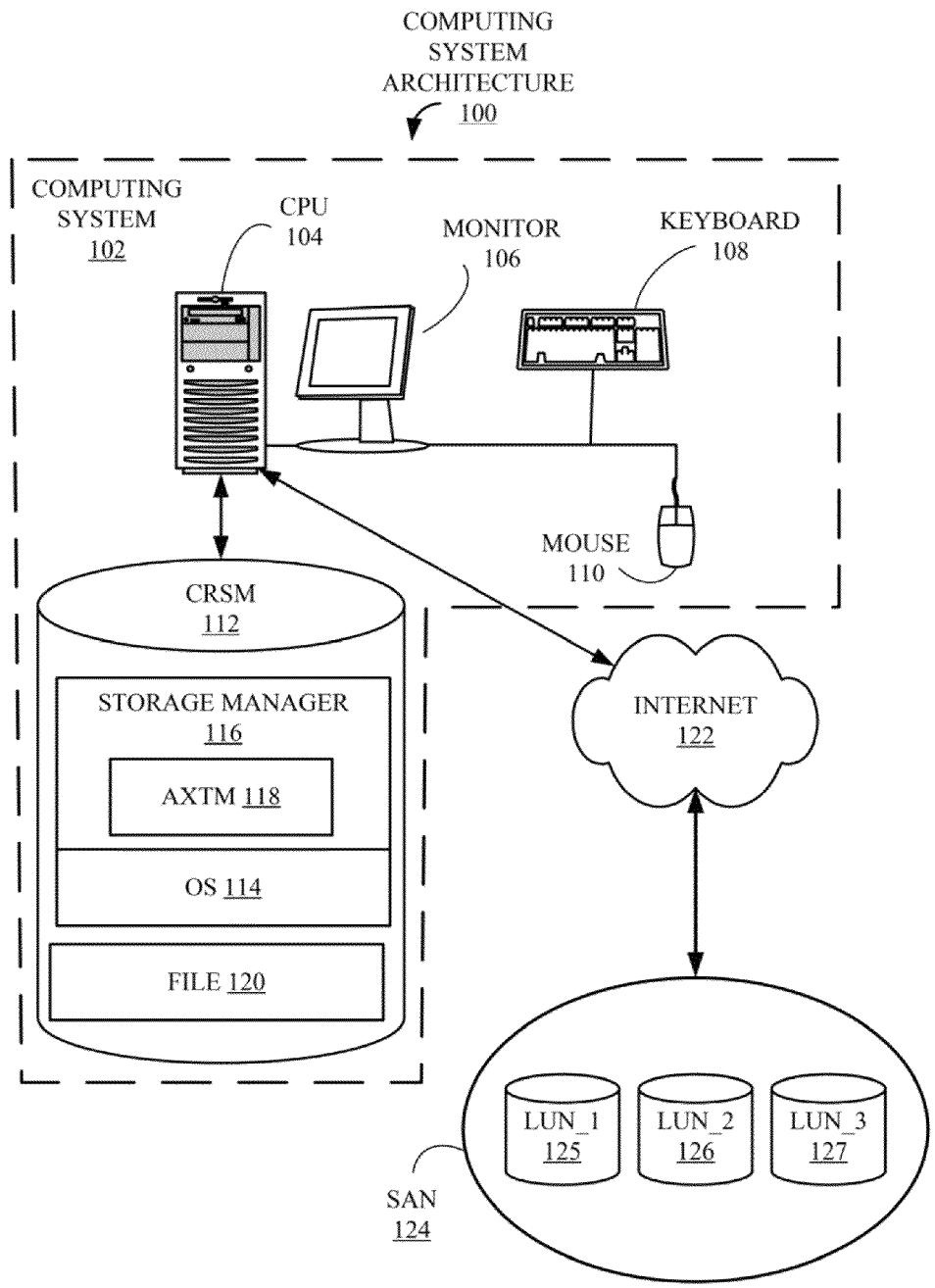
FIG. 1 is a block diagram of a computing system that may implement the claimed subject matter.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational actions to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Turning now to the figures, FIG. 1 is a block diagram of a computing system architecture 100 that may implement the claimed subject matter. A computing system 102 includes a central processing unit (CPU) 104, coupled to a monitor 106, a keyboard 108 and a pointing device, or "mouse," 110, which together facilitate human interaction with components of computing system architecture 100 and computing system 102. Also included in computing system 102 and attached to CPU 104 is a computer-readable storage medium (CRSM) 112, which may either dynamic or non-dynamic memory and incorporated into computing system 102 i.e. an internal device, or attached externally to CPU 104 by means of various, commonly available connection devices such as but not limited to, a universal serial bus (USB) port (not shown).

CRSM 112 is illustrated storing an operating system (OS) 114, a storage manager 116 and a file 120, which is used as an example throughout the reminder of the Specification. In this example, storage manager 116 also includes an adjusted Xtree module (AXTM) 118 that implements aspects of the claimed subject matter. AXTM 118 is described in more detail below in conjunction with FIG. 4.

Computing system 102 is connected to the Internet 122, which provides access to a storage area network (SAN) 124. SAN 124 includes three (3) storage devices, or logical units, i.e. a LUN_1 125, a LUN_2 126 and a LUN_3 127. Both local storage 120 and SAN 124, including LUNs 125-126, are provided as examples of file storage devices that might benefit from the disclosed technology. It should be noted there are many possible computing system configurations, of which computing system architecture 100 is only one simple example.

Figure 2:
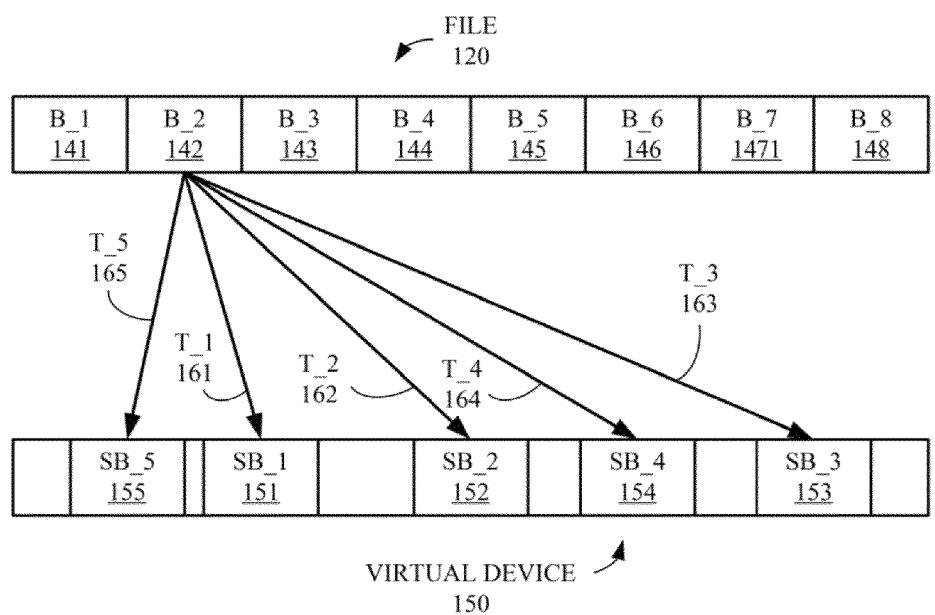
FIG. 2 is a diagram illustrating the correspondence between a file and the storage location in a virtual storage device with respect to a typical Read-on-Write file system.

FIG. 2 is a diagram illustrating the correspondence between a file and the storage location in a virtual storage device with respect to a typical Read-on-Write file system. A file 120 (FIG. 1) includes several blocks of data, i.e. B_1 141, B_2 142, B_3 143, B_4 144, B_5 145, B_6 146, B_7 147 and B_8 148. Blocks 141-148 are used only as examples. A typical file may include less, the same or more blocks of data. In addition, as should be familiar to one with skill in the relevant arts, a file such as 120 is typically divided into blocks by storage manager 116 (FIG. 1) to facilitate the storing of file 120 onto memory such as CRSM 112 (FIG. 1) and LUNs 125-126. The specific size of the blocks may depend upon the configuration of system architecture 100 and computing system 102 (FIG. 1).

A block, which in this example is B_2 142 of file 120, is assigned, at a time T_1 161, a particular storage location SB_1 151 in a virtual device 150. Upon modification of data associated with B_2 142, a new storage location SB_2 152 is assigned, at a time B_2 162, B_2 142 is stored in SB_2 152 and SB_1 151 may be released to be reused by storage manager 116 (FIG. 1), assuming as explained above that there are no dependencies on the old location. In a similar fashion, upon modification, at a time T_3 163, B_2 142 is stored in a storage location SB_3 153 and SB_2 152 is released; at a time T_4 164, B_2 142 is stored in a storage location SB_4 154 and SB_3 153 is released; and, at a time T_5 165, B_2 142 is stored in a storage location SB_5 155 and SB_4 154 is released. It should be noted that, as long as a the device on which a particular block is stored, the inode corresponding to the block remains the same, i.e. when a block is updated, the inode corresponding to the block is updated, including changing the storage block to which the inode points.

In other words, in a typical file system, any particular block 141-148 may be stored at almost any location on virtual device 150 and the inode is changed to reflect a new location. Because of typical redirect-on-write techniques, over time, the data of file 120 may move around on virtual device 150. This makes it difficult for a support analysis to be able to know or predict which logical block 151-155 stores the data of file 120 on virtual device 150 at any particular time.

Figure 3:
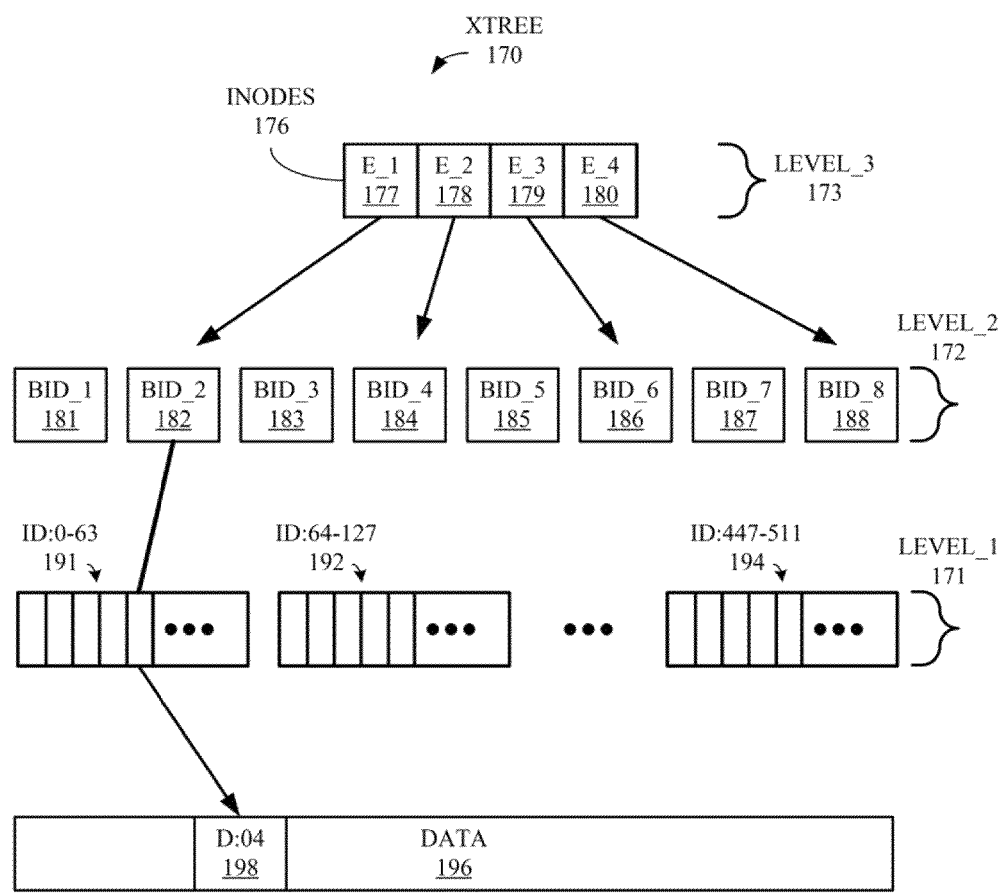
FIG. 3 is a diagram illustrating an Xtree in a typical Read-on-Write file system.

FIG. 3 is a diagram illustrating an Xtree 170 in a typical Read-on-Write file system. Xtree 170 includes three (3) levels, i.e. a level_1 171, a level_2 172 and a level_3 173. An inodes table, or simply inodes, 176, which is at level_3 173 and should be familiar to those with skill in the relevant arts, is a data structure that contains information about files, such as file 120 (FIGS. 1 and 2), on a system such as computing system 102 (FIG. 1). In this example, inode 172 is illustrated with four entries, i.e. an E_1 177, an E_2 178, an E_3 179 and an E_4 180. Information typically stored in each of entries 177-180 may include, but is not limited to, the size of a corresponding file, a device ID corresponding to a device on which the corresponding file is stored, information on the file's owner and group, access flags, timestamps and pointers to disk blocks that store the file's data. In this example, inodes 176 points to a number of block IDs in level_2 172, i.e. a BID_1 181, a BID_2 182, a BID_3 183, a BID_4 184, a BID_5 185, a BID_6 186, a BID_7 187 and a BID_8 188. Although a typical inode would typically include more entries and potentially point to more block IDs, for the sake of simplicity, only four and eight, respectively, are illustrated.

Each block ID in use points to an ID corresponding to a block of data in level_1 171. For convenience, IDs are illustrated in blocks of sixty-four (64), i.e. ID:0-63 191, ID:64-127 192 on up to an ID:447-511 194. It should be noted, that a typical xtree may include more groups of IDs, for the sake of simplicity, only three (3) are illustrated. In this example, BID_2 182 points to ID:4 of ID:0-63 191. ID:4 corresponds to a fourth data block, D:04 198 on a particular data storage 196.

Figure 4:
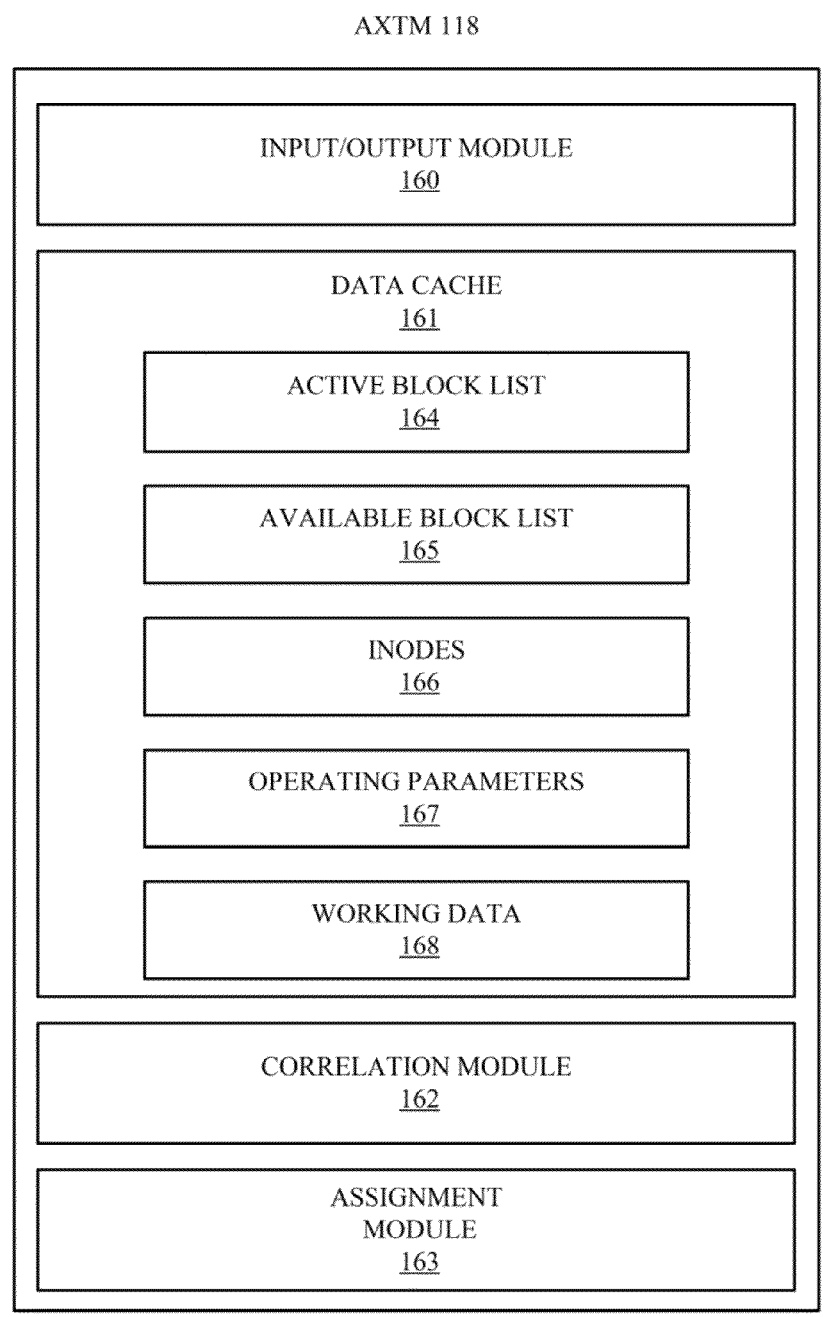
FIG. 4 is a block diagram of an Adjusted Xtree module (AXTM), first introduced in FIG. 1, that may implement aspects of the claimed subject matter.

FIG. 4 is a block diagram of Adjusted Xtree module (AXTM) 118, first introduced in FIG. 1, in greater detail. AXTM 118 includes an input/output (I/O) module 160, a data cache component 161, a correlation module 162 and an assignment module 163. For the sake of the following examples, AXTM 118 is assumed to execute in conjunction with storage manager 116 (FIG. 1) on computing system 102 (FIG. 1) and stored in CRSM 112 (FIG. 1). In the alternative, AXTM 118, and storage manager 116, may be integrated into OS 114 (FIG. 1). It should be understood that the claimed subject matter can be implemented in many types of computing systems and data storage structures but, for the sake of simplicity, is described only in terms of computing system 102 and system architecture 100 (FIG. 1). Further, the representation of AXTM 118 in FIG. 4 is a logical model. In other words, components 160-163 may be stored in the same or separates files and loaded and/or executed within computing system 102 or other components of computing system architecture 100 either as a single system or as separate processes interacting via any available inter process communication (IPC) techniques.

Figure 5:
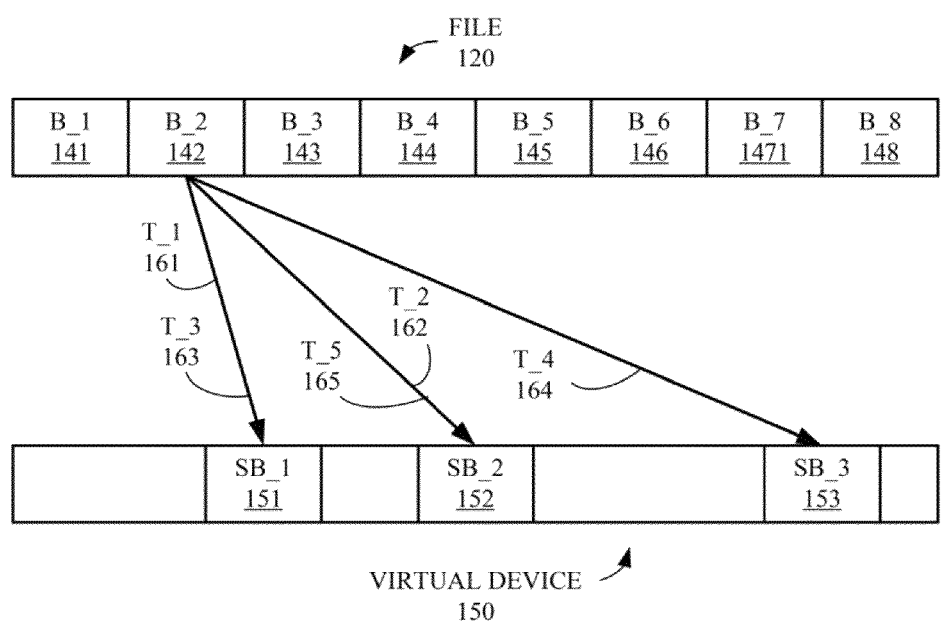
FIG. 5 is a diagram illustrating the correspondence between a file and the storage location in a virtual storage device in accordance with the claimed subject matter.

I/O module 160 handles any communication AXTM 118 has with other components of system 102 and architecture 100. Data cache 161 is a data repository for information AXTM 118 requires during normal operation. Examples of the types of information stored in data cache 161 include an active block list 164, an available block list 165, inodes 166, operating parameters 167 and working data 168. Active block list 164 stores pointer to active storage blocks (see SBs 151-153; FIG. 5) used by AXTM 118. Available block list 165 stores pointers to storage blocks that are available to AXTM 118. In the alternative, lists 164 and 165 may be combined into a listing of all blocks with a designation for each particular block indicating whether the particular block is active or available.

Inodes 166 stores pointers to all inodes including information on current active block IDs and previously used block IDs (see B_1 through B_5 141-145; FIG. 5). For example, a particular block such as BID_2 142 (FIG. 2) may point to SB_1 151 (FIG. 2). On a redirect on write operation, storage manager 116 may then store B_2 142 in SB_2 152 (FIG. 2). In this case, the corresponding entry in current inodes 166 would become a pointer to SB_2 152 and the corresponding entry would indicate that SB_1 151 has previously been used. It should be noted that each entry in inodes 166 may be configured to store indications for more than one previously used BID. The specific number of prior BIDs may be set with a configuration option associated with operating parameters 167. In addition, operating parameters 167 may include information on various other user or administrator preferences that have been set such as, but not limited to, a defined period of time prior to removal of a storage location from a list of available storage locations based on nonuse and a maximum number of unsuccessful utilization attempts prior to removal of the storage location from the list. Working data 168 stores information used by AXTM 118 during normal processing, including, but not limited to, intermediate results on ongoing processes.

Correlation module 162 associates a particular storage request with a corresponding inode, if one exists. Assignment module 163 determines a particular storage block to associate with a particular storage request based upon the correlation generated by correlation module 162 in accordance with the disclosed technology. Components 160-168 are described in more detail below in conjunction with FIGS. 5-7.

FIG. 5 is a diagram illustrating the correspondence between a file and the storage location in a virtual storage device in accordance with the claimed subject matter. One process that may implement the storage scheme is described below in conjunction with FIG. 7. File 120 (FIG. 1), which as explained above in conjunction with FIG. 2, includes several blocks of data, i.e. B_1 141, B_2 142, B_3 143, B_4 144, B_5 145, B_6 146, B_7 147 and B_8 148. A block, which in this example is B_2 142 of file 120, is assigned, at a time T_1 161, a particular storage location SB_1 151 in virtual device 150. Upon modification of data associated with B_2 142, at time T_2 162, a new storage location SB_2 152 is assigned. At this time, a pointer to SB_2 152 is stored in current inodes 154 (FIG. 4) of data cache 142 and data indicating SB_1 151 is stored in an appropriate location of previous inodes 156 (FIG. 4).

Upon the next modification of data associated with B_2 142, at time T_3 163, storage location SB_1 151 is assigned. At this time, a pointer to SB_1 151 is stored in current inodes 154 (FIG. 4) of data cache 142 and data indicating SB_2 152 is stored in an appropriate location of previous inodes 156 (FIG. 4). It should be noted that picking a new storage location at random from available, a previously used location, SB_1 151 is used. In a similar fashion, at time T_4 164, B2_142 is stored in SB_3 153 and, at time T_5 165, B_2 142 is again stored at SB_2 152 with appropriate modifications to current inodes 154 and previous inodes 156. In this manner, during re-direct on write operations, the data of file 120 moves around on virtual device 150 but reuses previous locations This makes it easier for a support analysis to know or predict which logical block 151-155 stores the data of file 120 on virtual device 150 at any particular time.

Figure 6:
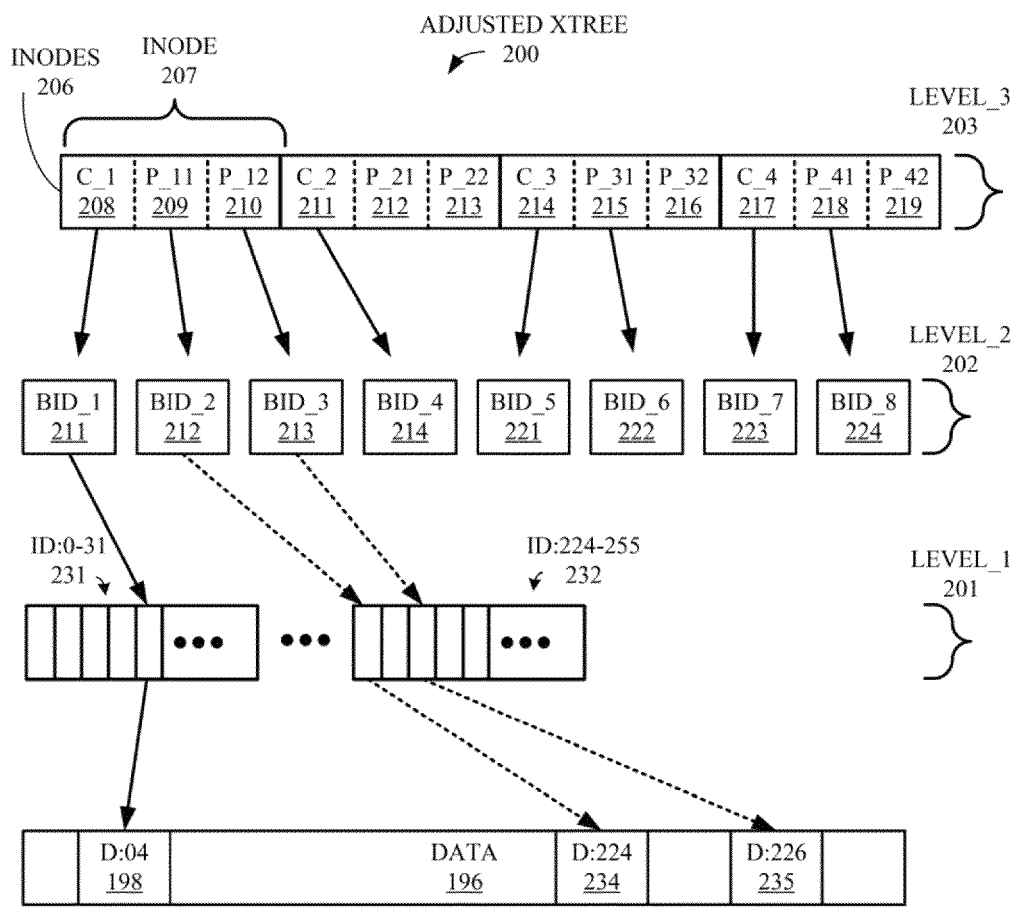
FIG. 6 is a diagram illustrating an Adjusted Xtree (AXT) that may implement aspects of the claimed subject matter.

FIG. 6 is a diagram illustrating an Adjusted Xtree (AXT) 200 that may implement aspects of the claimed subject matter. Like xtree 170 (FIG. 3), AXT includes three levels, i.e. a level_1 201, a level_2 202 and a level_3 203. Level_3 203 includes a inodes table, or simply "inodes," 206 (see 166, FIG. 4), which like inodes 176 (FIG. 3) is illustrated with four (4) entries, or "inode," one of which is labeled, i.e. inode 207. Each entry includes information pointing to a current storage location and two previous storage locations. The particular number of previous storage locations is configurable but, for the sake of simplicity only two (2) are shown. For example the first entry includes a first entry that points to a current location, i.e. C_1 208, pointing to a current storage location, i.e. a BID_1 211; a previous entry, i.e. P_11 209, that points to a previous storage location, i.e. a BID_2 212; and a previous entry, i.e. P_12 210, that points to a second previous storage location, i.e. a BID_3 213. In a similar fashion, a second entry C_2 211 corresponds to previous entries P_21 212 and P_22 213; a third entry C_3 214 corresponds to previous entries P_31 215 and P_32 216; and a fourth entry C_4 217 corresponds to previous entries P_41 218 and P_42 219. Entries in inodes 206 may also point to other block IDs in level_2 202, i.e. a BID_4 214, a BID_5 221, a BID_6 222, a BID_7 223 and a BID_8 224.

In this example, AXT 200 is illustrated at time T_4 164 (FIG. 5). C_1 208, associated with inodes 206, corresponding to a current storage location of a particular block of data, points to BID_1 211, which points to ID:4 of an ID:0-31 231 corresponding to a location D:04 198. A last previous storage location, associated with P_11 209 points to BID_2 212, which points to ID:224 associated with a location D:224 234 of data 196. A next to last previous location, associated with P_12 210 points to BID_3 213, which points to ID:226, associated with a location D:226 235. The maintenance of AXT 200 is explained in more detail below in conjunction with FIG. 7.

Figure 7:
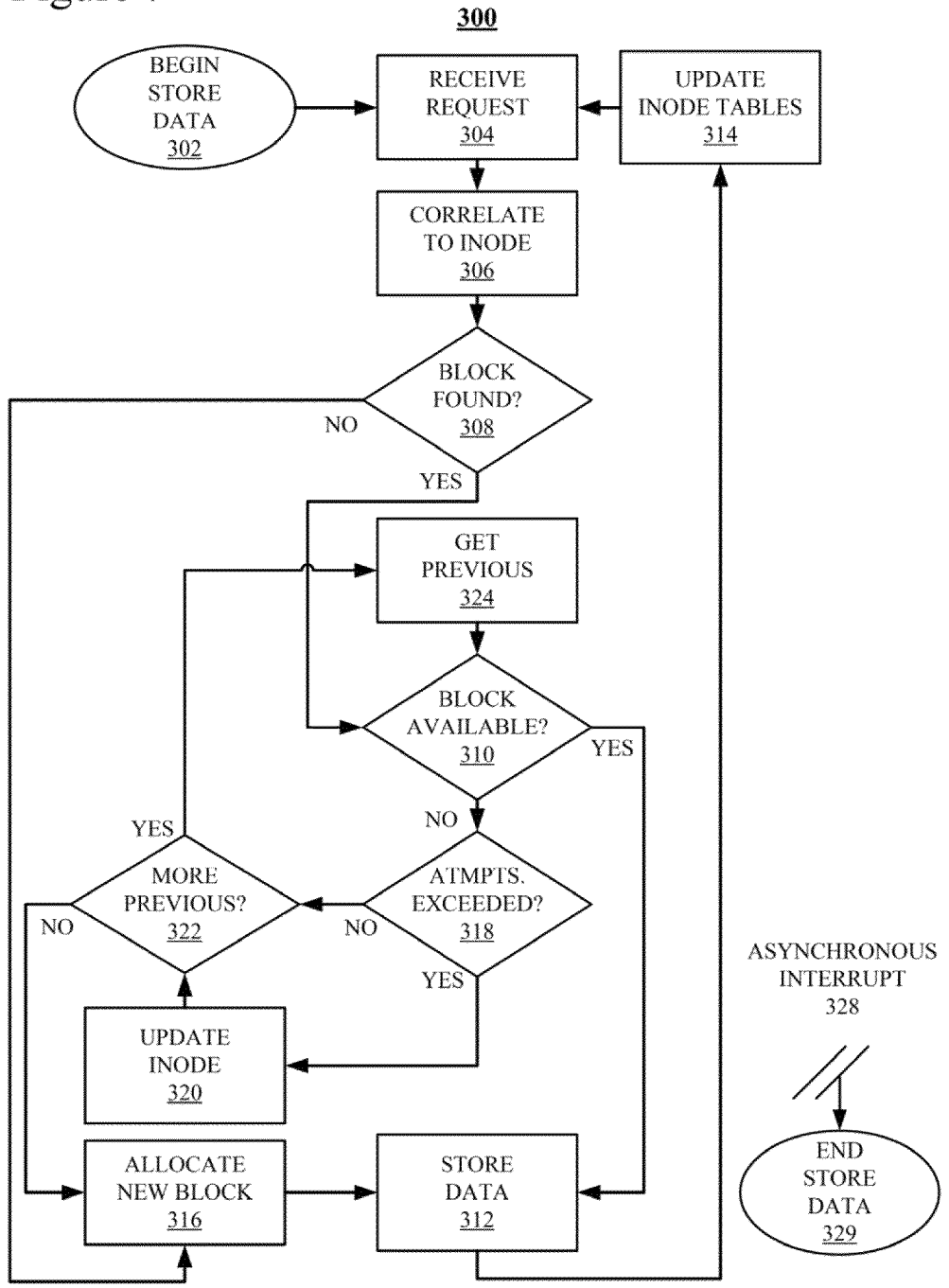
FIG. 7 is a flowchart of a Store Data process that may implement aspects of the claimed subject matter.

In one embodiment, each previous storage location 209, 210, 212, 213, 215, 216, 218 and 219 also may include a counter (not shown) representing attempts to access the block but finding the block unavailable (see 312, FIG. 7). AXTM 118 may be configured (see 167, FIG. 4) to remove a reference to a block that has been unavailable a defined number of time, either consecutively or over a defined periods of time or number of attempts (see 318 and 320, FIG. 7). In another embodiment, rather than a counter, each previous storage location 209, 210, 212, 213, 215, 216, 218 and 219 may include a timestamp. Periodically, a process (not shown) could scan the inodes and remove references to blocks which have not been used for a defined period of time. In the event a reference to a block is removed from an inode, the block would then become available for other storage tasks.

Further, in some file systems, an inode such as inodes 206 is stored in 1024 bytes (1 K) sections of memory and a page is stored in 4K memory, providing space for four (4) inode entries per page. In one implementation of the claimed subject matter, Information necessary to implement AXT 200 may be stored in 1K of memory in each page. In other words, each associated page would have three (3) rather than four (4) inodes with 1K of memory Available to store information related to previously used data storage address of the corresponding three 3) inodes. In this manner, the claimed subject matter may be implemented without altering a typical inode structure more than necessary.

FIG. 7 is a flowchart of a Store Data file process 300 that may implement aspects of the claimed subject matter. In this example, like process 250, process 300 is stored on CRSM 112 (FIG. 2) in conjunction with AXTM 118 (FIGS. 1 and 4) and executed on CPU 104 (FIG. 1) of computing system 102 (FIG. 1). Process 300 is typically initiated in conjunction with a startup of storage manager 116 (FIG. 1). In this example, a storage request is assumed to already be associated with an inode, i.e., a request for an update to a particular block of data. If the request is associated with a previously unstored block of data, a storage block and inode are simply assigned in accordance with the claimed subject matter, the data is stored in the assigned block and process 300 does not apply.

Process 300 starts in a "Begin Store Data" block 302 and proceeds immediately to a "Receive Request" block 304. During processing associated with block 304, AXTM 118 waits for a storage request corresponding got the update of a previously stored block of data. In response to such as request, control proceeds to a "Correlate to Inode" block 306. During processing associated with block 306, The data block of the store request received during processing associated with block 304, which in the following example is B_2 142 (FIG. 5), is correlated (see 162, FIG. 4) to a specific inode in inodes 206 (FIG. 6), which in this example is inode 207 (FIG. 6).

During a "Block Found?" block 308, a determination is made as to whether or not the correlated inode 207 associated with the storage request received during processing associated with block 304 includes references to previously used storage blocks, i.e., in this example, either P11 209 or P12 210 depending upon whether or not block 209 or 210 is currently storing the location of a data storage block. It should be noted that some inodes may have storage for references to blocks that have not yet been used and, in that case, a previously used storage block would not be found. If a reference to a previously used storage block is found, process 300 proceeds to a "Block Available?" block 310. During processing associated with block 310, a determination is made whether or not the data block found during processing associated with block 308 is available for data storage. It should be noted that the disclosed techniques do not necessarily guarantee that a data block associated with the previous inode is available, e.g., has not been utilized to store a different data block corresponding to a different inode.

If the data block exists and is available, during processing associated with a "Store Data" block 312, the data block associated with the request received during processing associated with block 304 is stored in the particular data block. During processing associated with an "Update Inode Tables" block 314, inode table 206 is updated to reflect the new information. In other words, the location of the data block used to store the data during processing associated with block 314 is entered as the current location C_1 208 (FIG. 6) and the location previous stored in C_1 208 is stored in P_11 209. Control then returns to Receive Request block 304 during which processing associated with process 300 waits for the next data storage request and processing continues as described above and below.

If, during processing associated with block 308, a previously stored block is not found, control proceeds to an "allocate New Block" 316. During processing associated with block 316, a new data storage block is assigned (see 165, FIG. 4), the data is stored in the newly allocated block during processing associated with block 312 and processing continues as described above. If, during processing associated with block 310, the block found during processing associated with block 308 is not available, control proceeds to an "Attempts (Atmpts.) Exceeded?" block 318. During processing associated with block 318, a determination as made as to whether or not a counter (not shown) associated with P_11 209 has exceeded a predefined limit. If so, control proceeds to an "Update Inode" block 320. During processing associated with block 320, the reference to the unavailable storage location is deleted from P_11 209, in effect precluding AXTM 118, in subsequent attempt to update data associated inode 207, from checking the unavailable storage location.

Once a determination has been made during processing associated with block 318 that the number of attempts to save data to the location referenced by P_11 209 has not exceeded a predefined limit or, during processing associated with block 320, inode 207 has been updated, control proceeds to a "More Previous?" block 322. During processing associated with block 322, a determination is made as to whether or not other previously used locations, such as P_12 210, might be available. If so, control proceeds to a "Get Previous" block 324, P_12 210 is accessed, during processing associated with block 310, P_12 210 is checked for availability and processing continues as describe above. If, during processing associated with block 322, a determination is made that there are no more possible previously stored locations, control proceeds to block 316 and processing continues as described above.

Finally, process 300 is halted by means of an asynchronous interrupt 328, which passes control to an "End Store Data" block 329 in which process 300 is complete. Interrupt 328 is typically generated when the OS 114 or computing system 102 is halted. During normal operation, process 300 continuously loops through the blocks 304, 306, 308, 310, 312, 314, 316, 318, 320, 322 and 324, processing data storage requests as received.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A method, comprising:
   receiving a data storage request corresponding to a data block stored at a current storage location;
   correlating the data block to an inode;
   retrieving information identifying a previous storage location corresponding to a previous storage location at which the data block was stored;
   saving the data block at the previous storage location; and
   saving, in conjunction with the inode, information identifying the current location as a new previous location and the previous location as a new current location.

2. The method of claim 1, wherein the previous storage location is one of a plurality of previous storage locations at which the data block was stored, the method further comprising selecting the previous storage location from the plurality of previous storage locations.

3. The method of claim 1, wherein the method is implemented in a redirect-on-write file system.

4. The method of claim 1, further comprising, in response to a determination that there is not a previous storage location:
   allocating a new storage location; and
   saving, in conjunction with the inode, information identifying the current location as a new previous location and the new storage location as a new current location.

5. The method of claim 1, further comprising, in response to a determination that a previous storage location is no longer available:
   allocating a new storage location; and
   saving, in conjunction with the inode, information identifying the current location as a new previous location and the new storage location as a new current location.

6. The method of claim 1, further comprising deleting the information identifying the previous storage location in response to a determination that, based upon a timestamp stored in conjunction with the previous storage location, that the previous storage location has not been utilized for a defined period of time.

7. The method of claim 1, further comprising deleting, the information identifying the previous storage location in response to a determination that, based upon a counter stored in conjunction with the previous storage location, that the previous storage location has not been available for a defined number of storage attempts.

8. An apparatus, comprising:
   a processor;
   a computer-readable storage medium, coupled to the processor; and
   logic, stored on the computer-readable storage medium and executed on the processor, for:
      receiving a data storage request corresponding to a data block stored at a current storage location;
      correlating the data block to an inode;
      retrieving information identifying a previous storage location corresponding to a previous storage location at which the data block was stored;
      saving the data block at the previous storage location; and
      saving, in conjunction with the inode, information identifying the current location as a new previous location and the previous location as a new current location.

9. The apparatus of claim 8, wherein the previous storage location is one of a plurality of previous storage locations at which the data block, was stored, the method further comprising selecting the previous storage location from the plurality of previous storage locations.

10. The apparatus of claim 8, wherein the apparatus is employed in conjunction with a redirect-on-write file system.

11. The apparatus of claim 8, the logic further comprising logic for, in response to a determination that there is not a previous storage location:
    allocating a new storage location; and
    saving, in conjunction with the inode, information identifying the current location as a new previous location and the new storage location as a new current location.

12. The apparatus of claim 8, the logic further comprising logic for, in response to a determination that a previous storage location is no longer available:
    allocating a new storage location; and
    saving, in conjunction with the inode, information identifying the current location as a new previous location and the new storage location as a new current location.

13. The apparatus of claim 8, the logic further comprising logic for deleting the information identifying the previous storage location in response to a determination that, based upon a timestamp stored in conjunction with the previous storage location, that the previous storage location has not been utilized for a defined period of time.

14. A computer programming product, comprising:
    a non-transitory computer-readable storage medium; and
    logic, stored on the computer-readable storage medium for execution on a processor, for:
       receiving a data storage request corresponding to a data block stored at a current storage location;
       correlating the data block to an inode;

retrieving information identifying a previous storage location corresponding to a previous storage location at which the data block was stored;

saving the data block at the previous storage location; and saving, in conjunction with the inode, information identifying the current location as a new previous location and the previous location as a new current location.

15. The computer programming product of claim 14, wherein the previous storage location is one of a plurality of previous storage locations at which the data block was stored, the method further comprising selecting the previous storage location from the plurality of previous storage locations.

16. The computer programming product of claim 14, wherein the apparatus is employed in conjunction with a redirect-on-write file system.

17. The computer programming product of claim 14, the logic further comprising logic for, in response to a determination that there is not a previous storage location:

allocating a new storage location; and saving, in conjunction with the inode, information identifying the current location as a new previous location and the new storage location as a new current location.

18. The computer programming product of claim 14, the logic further comprising logic for, in response to a determination that a previous storage location is no longer available:

allocating a new storage location; and saving, in conjunction with the inode, information identifying the current location as a new previous location and the new storage location as a new current location.

19. The computer programming product of claim 14, the logic further comprising logic for deleting the information identifying the previous storage location in response to a determination that, based upon a timestamp stored in conjunction with the previous storage location, that the previous storage location has not been utilized for a defined period of time.

20. A redirect-on-write file system, comprising:

a processor;

a computer-readable storage medium, coupled to the processor; and logic, stored on the computer-readable storage medium and executed on the processor, for:

receiving a data storage request corresponding, to a data block stored at a current storage location;

correlating the data block to an inode;

retrieving information identifying a previous storage location corresponding to a previous storage location at which the data block was stored;

saving the data block at the previous storage location; and saving, in conjunction with the inode, information identifying the current location as a new previous location and the previous location as a new current location.

21. The redirect-on-write file system of claim 20, wherein the previous storage location is one of a plurality of previous storage locations at which the data block was stored, the method further comprising selecting the previous storage location from the plurality of previous storage locations.

22. The redirect-on-write file system of claim 20, the logic further comprising logic for, in response to a determination that there is not a previous storage location:

allocating a new storage location; and saving, in conjunction with the inode, information identifying the current location as a new previous location and the new storage location as a new current location.

23. The redirect-on-write file system of claim 20, the logic further comprising logic for, in response to a determination that a previous storage location is no longer available:

allocating a new storage location; and saving, in conjunction with the inode, information identifying the current location as a new previous location and the new storage location as a new current location.

24. The redirect-on-write file system of claim 20, the logic further comprising logic for deleting the information identifying the previous storage location in response to a determination that, based upon a timestamp stored in conjunction with the previous storage location, that the previous storage location has not been utilized for a defined period of time.

25. The redirect-on-write file system of claim 20, the logic further comprising logic for deleting the information identifying the previous storage location in response to a determination that, based upon a counter stored in conjunction with the previous storage location, that the previous storage location has not been available for a defined number of storage attempts.

\* \* \* \* \*